United States Patent [19]

Tanaka et al.

[11] 4,370,464

[45] Jan. 25, 1983

[54] CATIONIC POLYMER FLOCCULANT

[75] Inventors: Katsutoshi Tanaka, Chigasaki; Hisao Takeda, Zama; Mutsumi Kawano, Chigasaki; Isao Miyahara, Samukawa, all of Japan

[73] Assignees: Kyoritsu Yuki Co., Ltd.; Mitsubishi Chemical Industries, Ltd., both of Tokyo, Japan

[21] Appl. No.: 315,930

[22] Filed: Oct. 28, 1981

[30] Foreign Application Priority Data

Jun. 9, 1981 [JP] Japan ................................. 56-88731

[51] Int. Cl.$^3$ ............................................. C08G 65/26
[52] U.S. Cl. ..................................... 528/99; 525/496; 528/104; 528/107; 523/420; 524/841
[58] Field of Search ................. 525/496; 528/99, 104, 528/107; 524/841; 523/420

[56] References Cited

U.S. PATENT DOCUMENTS

| | | | |
|---|---|---|---|
| 2,695,887 | 11/1954 | DeGroote | 525/496 X |
| 2,839,500 | 6/1958 | DeGroote | 525/496 X |
| 2,997,460 | 8/1961 | DeGroote | 525/496 X |
| 3,038,881 | 6/1962 | DeGroote | 525/496 X |
| 3,975,305 | 8/1976 | Tai et al. | 528/99 |
| 4,000,116 | 12/1976 | Renner | 528/99 |
| 4,038,318 | 7/1977 | Tai | 260/567.6 P |
| 4,155,847 | 5/1979 | Tanaka et al. | 210/54 |

Primary Examiner—Earl A. Nielsen
Attorney, Agent, or Firm—Oblon, Fisher, Spivak, McClelland & Maier

[57] ABSTRACT

Novel cationic polymer flocculants are prepared by polycondensation of an epihalohydrin and mixed Mannich reaction products of a monohydric phenol and bisphenol with formaldehyde and dialkylamine. The flocculants are stable in aqueous solutions and show an excellent effect in purification of industrial effluents.

11 Claims, No Drawings

CATIONIC POLYMER FLOCCULANT

BACKGROUND OF THE INVENTION

The present invention relates to a cationic polymer flocculant having excellent stability.

Formerly, the present inventors have found that a polymer substance having quarternary ammonium groups obtained by polycondensation of epihalohydrin and Mannich reaction products of monohydric phenol, that is, the amines mainly comprising phenol derivatives having dialkylaminomethyl groups which have been introduced to the monohydric phenol by reacting dialkylamine and formaldehyde with the eiphalohydrin has an excellent flocculation capability, and then have proposed a cationic polymer flocculant comprising the thus obtained polycondensate (refer to Japanese Patent Application Laying Open No. 35185/79 which corresponds to U.S. Pat. No. 4,155,847).

However, there is a tendency of molecular weight-reduction in the above-mentioned polycondensate due to the occurrence of break down of the main chain with the progress of time. Consequently, the amount of polymeric cation determined by colloid titration showed a gradual reduction resulting in a tendency of the reduction of performance as a polymer flocculant.

For instance, the polycondensate of epichlorohydrin and Mannich reaction products obtained by reacting three moles of formaldehyde and three moles of dimethylamine with one mole of phenol showed a conspicuous break down of the polymer molecule particularly in an aqueous solution at a high temperature and at a low concentration. For instance, after keeping 0.5% aqueous solution of the above-mentioned polycondensate at 50° C. for one day, the amount of polymeric cations became 38% by mole of the original amount.

Although trials have been carried out to quarternize a part of the dialkylaminomethyl groups with lower alkyl halide in order to prevent the deterioration of the polycondensate, there is no advantage in this method of complicating the reaction steps.

SUMMARY OF THE INVENTION

As a result of the present inventors' efforts toward overcoming the above-mentioned deficiency, the present inventors have found that polycondensates of epihalohydrin, a mixture containing Mannich reaction products of monohydric phenol and Mannich reaction products of bisphenol at a specified ratio are excellent in flocculation capability and less susceptive of deterioration of its polymeric cations, that is, reduction of molecular weight, and on this result, the present inventors have completed the present invention.

It is an object of the present invention to provide a cationic polymer flocculant comprising a polycondensate of (i) epihalohydrine and (ii) a mixture of component (a) and component (b) at a molar ratio of (a)/(b) in the range of 90/10 to 50/50 wherein said component (a) is a reaction product of monohydric phenol with formaldehyde and dialkylamine of two to six carbon atoms, and said component (b) is a reaction product of bisphenol with formaldehyde and dialkylamine of two to six carbon atoms. Another object is to provide a cationic polymer flocculant comprising a polycondensate of (i) epichlorohydrin and (ii) a mixture of component (a) and component (b) at a molar ratio of (a)/(b) in the range of 90/10 to 50/50 wherein said component (a) is a reaction product of phenol with formaldehyde and dimethylamine, and said component (b) is a reaction product of 2,2-bis(4-hydroxyphenyl)propane with formaldehyde and dimethylamine. A further object is to provide a process for flocculating flocculatable substances contained in industrial effluent, which comprises adding to said effluent an effective amount of flocculant including a polycondensate of (i) epihalohydrin and (ii) a mixture of component (a) and component (b) at a molar ratio of (a)/(b) in the range of 90/10 to 50/50 wherein said component (a) is a reaction product of monohydric phenol with formaldehyde and dialkylamine of two to six carbon atoms, and said component (b) is a reaction product of bisphenol with formaldehyde and dialkylamine of two to six carbon atoms. Still other objects will appear hereinafter.

DETAILED DESCRIPTION OF THE INVENTION

The present invention will be described in detail. Monohydric phenol for use in the present invention as a starting material includes phenol and derivatives of phenol having a lower alkyl group of one to three carbon atoms on the benzene ring such as cresol and the like, phenol is preferably used. Bisphenol as another starting material of the present invention means alkylidenediphenol, and concretely, bisphenol includes 2,2-bis(4-hydroxyphenyl)propane [so-called bisphenol A]; 2,2-bis(4-hydroxyphenyl)butane [so-called bisphenol B] and the like, and bisphenol A is preferably used. The reaction of monohydric phenol or bisphenol with formaldehyde and di-loweralkylamine is known as Mannich reaction, and concerning the Mannich reaction of monohydric phenol, the reaction is carried out by the known method. The reaction is carried out by either adding dialkylamine or formaldehyde to the phenol followed by the formaldehyde or dialkylamine, or in the alternative reacting the dialkylamine with formaldehyde and adding this mixture to the phenol [see "Organic Reactions Vol. I" (published by John Wiley & Sons in 1942)], Mannich reaction of bisphenol is also carried out in the same manner as above.

In order to obtain a mixture of (a) Mannich reaction products of monohydric phenol and (b) Mannich reaction products of bisphenol at a predetermined ratio, both monohydric phenol and bisphenol as the starting material are used at their molar ratio of the predetermined value.

The Mannich reaction product of monohydric phenol and the Mannich reaction product of bisphenol may be separately made and then mixed together, or at first monohydric phenol is mixed with bisphenol and then the mixture of monohydric phenol and bisphenol is brought into reaction to obtain the mixed products of Mannich reaction.

Since monohydric phenol has at most three active hydrogen atoms in its molecule, Mannich reaction may occur in at most 3 moles of formaldehyde and three moles of dialkylamine to one mole of monohydric phenol.

On the other hand, since bisphenol has four active hydrogen atoms in its molecule, Mannich reaction may occur in at most four moles of formaldehyde and four moles of dialkylamine to one mole of bisphenol. The amount of formaldehyde and the amount of dialkylamine introduced in Mannich reaction may be in the range of equimolar to trimolar to monohydric phenol and may be in the range of equimolar to tetramolar to bisphenol, however, in consideration of the easiness of the polycondensation with epihalohydrin in the next step, it is preferable to introduce, more than two moles of formaldehyde and more than two moles of dialkylamine per one mole of monohydric phenol or bisphenol respectively.

In the case where the mixture of monohydric phenol and bisphenol are brought into Mannich reaction, the moles of formaldehyde and dialkylamine to be introduced is preferably as follows:

$$2X+2Y \leq M^1 \leq 3X+4Y, \text{ and}$$

$$2X+2Y \leq M^2 \leq 3X+4Y$$

wherein X, Y, $M^1$ and $M^2$ respectively represent the molar amount of monohydric phenol, bisphenol, formaldehyde and dialkylamine to be added.

Although formaldehyde and dialkylamine are used at about an equimolar ratio, one of them may be used in a little excess of the other, and instead of formaldehyde, a substance which generates formaldehyde such as paraformaldehyde may be used. As dialkylamine, amines having a lower alkyl of one to three carbon atoms are suitable, particularly, dimethylamine, ethylmethylamine, diethylamine and the like are preferable because of their reactivity. In addition, it is possible to use more than one of these amines in combination.

As has been stated, the molar ratio of monohydric phenol to bisphenol is preferably in the range of 90/10 to 50/50, and in the case where bisphenol is less than 10 mole %, the reduction of the polymeric cation cannot be sufficiently suppressed, and on the other hand, in the case of over 50 mole %, it is economically unfavorable because the price of bisphenol is relatively high.

Although the temperature of Mannich reaction is selected from the range of 10° to 80° C., since at a lower temperature, the longer time of reaction is necessary and at a higher temperature, the dissipation by evaporation of dialkylamine and the formation of by-product are apt to occur, it is ordinarily preferable to carry out the reaction at 30° to 60° C. for 3 to 6 hours.

As the reaction solvent, water is ordinarily used, and if necessary, an organic solvent having miscibility with water may be used.

In Mannich reaction, one to three dialkylaminomethyl groups are introduced into ortho- or para-position of the hydroxy group of monohydric phenol as is shown in the following formula (a), and one to four dialkylaminomethyl groups are introduced into respective two ortho-positions of the two hydroxy groups of bisphenol as is shown in the following formula (b).

The formula (a):

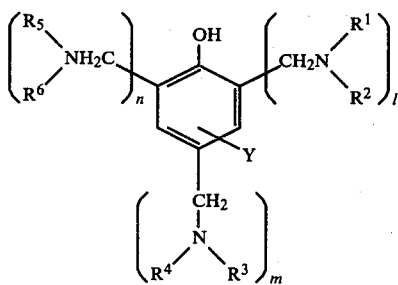

wherein Y represents a hydrogen atom or an alkyl group of one to three carbon atoms, $R^1$ to $R^6$ are the same or different alkyl groups of one to three carbon atoms, and l, m and n represent respectively a number of 0 or 1, provided that l, m and n do not simultaneously represent 0. For example, in the case where m and n represent 0, the formula (a) is shown by the following formula.

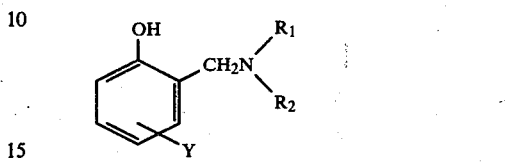

The formula (b):

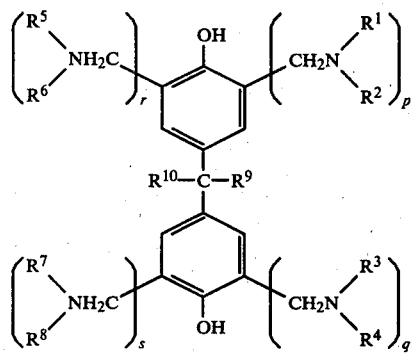

wherein $R^1$ and $R^{10}$ are the same or different alkyl group of one to three carbon atoms and p, q, r and s represent respectively a number of 0 or 1, provided that p, q, r and s do not simultaneously represent 0.

After Mannich reaction is over, the respective products, i.e., dialkylaminomethylated monohydric phenol and dialkylaminomethylated bisphenol, can be isolated, however, ordinarily, without being isolated they are respectively brought into polycondensation with epihalohydrin.

As epihalohydrin, epichlorohydrin, epibromohydrin and the like can be mentioned, however, epichlorohydrin is ordinarily used, preferably in an amount of 0.7 to 2 times by mole of the sum of monohydric phenol and bisphenol. In the case of less than 0.7 times, polymer having high molecular weight is not obtained, and in the case of over 2 times, networks of three-dimentional structure are formed and the product easily becomes water-insoluble. The reaction temperature of polycondensation with epihalohydrin is selected from the range of 10° to 90° C., and actually, the controllable temperature range is decided in accordance with the reactivity of the Mannich reaction products which is brought into polycondensation with epihalohydrin. Namely, both the products obtained by bringing three parts by mole of formaldehyde and three parts by mole of dimethylamine into Mannich reaction with one part by mole of monohydric phenol and the product obtained by bringing four parts by mole of formaldehyde and four parts by mole of dimethylamine into Mannich reaction with one part by mole of bisphenol A are highly reactive, and accordingly, it is necessary to carry out polycondensation at a temperature of lower than 40° C. in the case where the Mannich reaction product is reacted with equimole of epichlorohydrin. For instance, in the case of the molar ratio of monohydric phenol and bisphenol is 70/30, the reaction time for about one hour at 40° C. after addition of epichlorohydrin was sufficient for obtaining polycondensate of suffiently high molecular weight. In the case of using a mixture of a product obtained by bringing two parts by mole of formaldehyde and two parts by mole of dimethylamine to one part by mole of phenol into Mannich reaction and a product obtained by bringing two parts by mole of formaldehyde and two parts by mole of dimethylamine to one part by mole of bisphenol A into Mannich reaction, the polycondensation is desirably carried out at 50° C. for 2 hours.

Since polycondensation is exothermic, it is preferable to carry out external cooling or the reaction temperature is preferably controlled by adjusting the rate of addition of epihalohydrin.

Although the solvent used in polycondensation is not particularly restricted, the reaction is ordinarily carried out in an aqueous solvent as in the case of Mannich reaction.

In order to stop the polycondensation, an acid is added to the reaction system at the time when the viscosity of the product reached at the expected value. Generally, the acid may be added at the time when Brookfield viscosity of the reaction mixture containing 50% by weight of the polycondensate becomes to higher than 1000 cp, preferably, higher than 4000 cp. The kinds of the acid are not specified, however, a mineral acid such as hydrochloric acid, sulfuric acid and the like is preferably used in an amount which makes the pH of the reaction system to lower than 7, however, the pH is more preferably reduced to lower than 4 from the view point of stability of the product.

It is natural that the viscosity of the final product of polycondensation depends on the concentration of the polymer in the resultant reaction mixture, and in the case of concentration of the polymer of 45% by weight, the product showing a Brookfield viscosity of higher than about 100 cp (intrinsic viscosity, [η], of about 0.2 dl/g), more preferably, that showing Brookfield viscosity of higher than 800 cp (intrinsic viscosity of 0.6 dl/g) is useful as a flocculant.

The thus obtained polycondensate is presumed to have the structures shown in the following formulae (I) to (V):

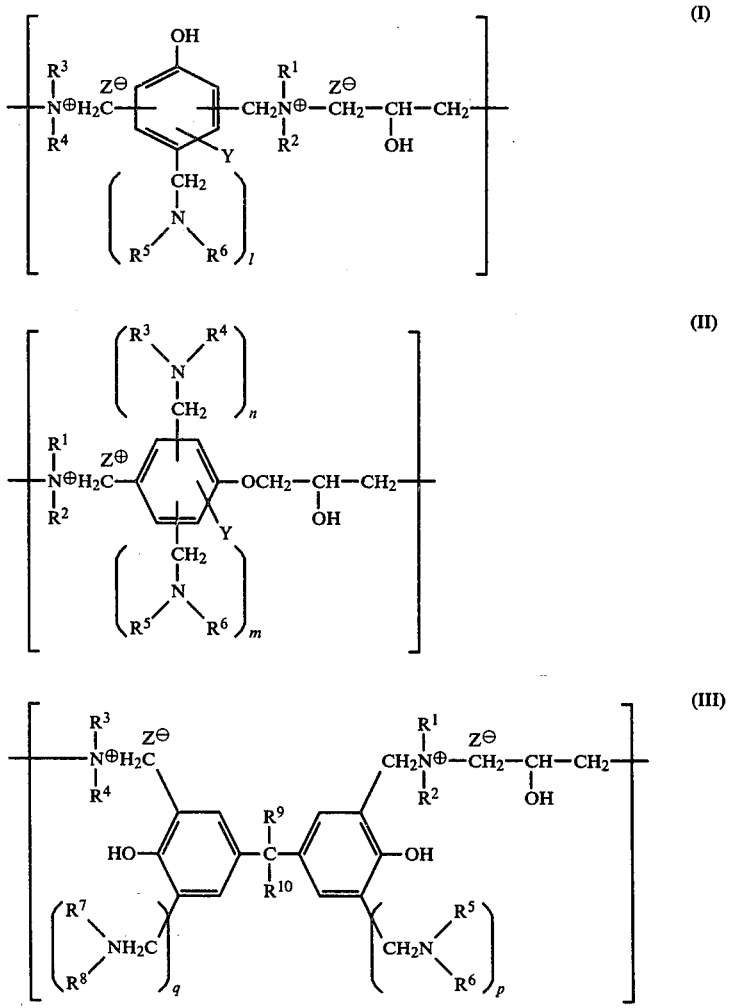

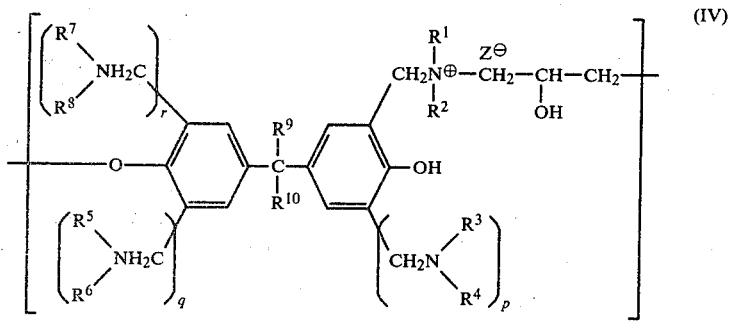
(IV)

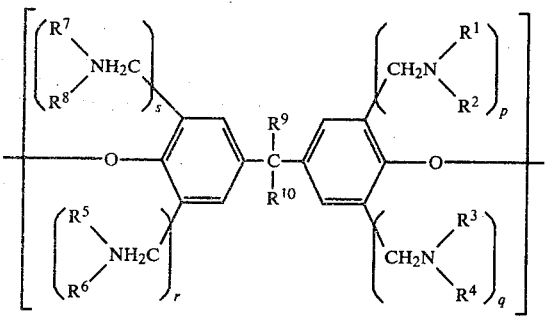
(V)

Y, $R^1$ and $R^{10}$, l, m, n, p, q, r and s have the same meanings as previously mentioned and Z is halogen atom.

As will be made clear later in Example 5, the flocculant according to the present invention have polymeric cations less deteriorated as compared to the flocculant produced by only using the product of Mannich reaction of phenol, and accordingly, it is preferable as the flocculant. Although the reason of suppressing of the deterioration of polymeric cations has not been elucidated, it is presumed as one of the reasons that bisphenol serves the purpose for a prevention against the oxidation of polymer.

In addition, it is also one of the characteristic features of the present invention that polymer having high molecular weight is obtained in polycondensation by adding the dialkylaminomethylated product of bisphenol.

It is considered that the larger molecular weight of bisphenol is one of the reasons and that bisphenol suppresses the break down of the molecular chains due to the heat-evolution at the time of stopping polycondensation by the addition of an acid. For instance, in the case where the Mannich reaction products of one part by mole of phenol, three parts by mole of formaldehyde and three parts by mole of dimethylamine is polycondensed with epichlorohydrin and the polyconsensation was stopped by hydrochloric acid at the point of Brookfield viscosity of 7000 cp in the concentration of polymer of 50% by weight in aqueous solution, the viscosity of the final product of the concentration of 45% by weight in aqueous solution was 800 cp of Brookfield viscosity. On the other hand, in the case where the mixture of the above Mannich reaction products and 15 mol% of the Mannich reaction products of one part by mole of bisphenol and four parts by mole of formaldehyde and four parts by mole of dimethylamine, are polycondensed with epichlorohydrin, the final product showed a viscosity of 3000 cp at the concentration of polymer in the aqueous solution of 45% by weight. The temperature of the latter case was the same as in the former case, that is, 25° C.

The flocculants according to the present invention exhibit very good effects when applied, for example, for removal of mud from river water; for acceleration of settlement of sludge in the sewage treating equipments; for dewatering of such sludge; for treatment of oil-containing effluent derived from the refining processes in the petrochemical industry; for acceleration of filtration of clay on production of cement; for concentration and filtration of porcelain clay slurry in the ceramic industry; for clarification of effluent from porcelain clay-treating processes; for dewatering of concentrate in the mining industry; for clarification of effluent from quarrying processes and also from coal dressing processes; for clarification of effluent from blast furnaces in the iron and steel industry and in the metal-working industry; for removal and settlement of mud from effluent derived from polishing processes; for settling and floating treatments of washings and oil-containing effluent from casting processes using cupola; for retention aid of dry or wet strength agent, drainage aid, for fixation of size, retention aid of pigment and filler in the paper-making industry, clarification of effluent from paper-making processes and dewatering of the resulting sludge; for clarification of effluent from pulp-making processes; for decolorization and clarification of effluent from deinking processes; for flocculation of various effluents in the food industry; for dewatering of excess sludge from biological treatment process as a floating and settling agent for effluent in the dye industry; for clarification of effluent from the washing of gravel or pebbles; for clarification of effluent containing anionic surfactant or detergent, and the like.

In practice the flocculants according to the present invention may be used together with other inorganic and/or organic flocculants. Anionic and/or cationic polyacrylamide flocculants may be used in combination with the flocculants of the invention.

The present invention will be illustrated by way of the following examples, which should not be construed as a limitation thereof.

EXAMPLE 1

Into a flask, 32.9 g (0.35 moles) of phenol was introduced and 94.5 g of aqueous 50% by weight solution of dimethylamine (corresponding to 1.05 moles) was added to the flask, and after adding dropwise 85.1 g of aqueous 37% by weight solution of formaldehyde (corresponding to 1.05 moles), the reaction system was kept at 55° C. while stirring for 4 hours to carry out Mannich reaction.

In another flask, 34.2 g (0.15 moles) of bisphenol A was introduced and after adding 54 g of aqueous 50% by weight solution of dimethylamine (corresponding to 0.6 moles) and 48.6 g of aqueous 37% by weight solution of formaldehyde (corresponding to 0.6 moles) to the flask, the reaction system was kept at 55° C. while stirring for 4 hours to carry out another run of Mannich reaction.

After combining both the reaction mixtures, 46.3 g of epichlorohydrin (0.5 moles) was added dropwise to the mixture while stirring at a constantly controlled temperature of 40° C. during 40 min. After the addition of epichlorohydrin was over, the viscosity of reaction mixture began to show an increase and at the time when the value of Brookfield viscosity of the mixture showed 8000 cp one hour after the addition, 119.9 g of aqueous 35% by weight hydrochloric acid solution (corresponding to 1.15 moles) was added to the reaction system to stop polycondensation. The thus obtained product of polycondensation showed a Brookfield viscosity of 5200 cp (corresponding to the intrinsic viscosity, [$\eta$], of 0.90 dl/g) at 25° C.

EXAMPLE 2

Into a flask, 40.0 g (0.425 moles) of phenol and 17.1 g (0.075 moles) of bisphenol A were introduced, and after adding 141.8 g of aqueous 50% by weight solution (corresponding to 1.575 moles) of dimethylamine and 127.7 g of aqueous 37% by weight solution of formaldehyde (corresponding to 1.575 moles) to the flask, the system was kept at 50° C. for 5 hours while stirring to carry out Mannich reaction.

Into the thus prepared product of Mannich reaction, 46.3 g (0.5 moles) of epichlorohydrin was added dropwise while keeping the reaction system at 40° C. and stirring during 40 min. after the addition was over, the viscosity of the reaction mixture showed a gradual raise to Brookfield viscosity of 7000 cp one hour after the addition. At this point, 112.1 g of aqueous 35% by weight solution of hydrochloric acid (corresponding to 1.075 moles) was added to the reaction mixture to stop polycondensation. The thus obtained polycondensate showed Brookfield viscosity of 4300 cp at 25° C. (intrinsic viscosity, [$\eta$], of 0.85 dl/g).

EXAMPLE 3

Into a flask, 32.9 (0.35 moles) of phenol was introduced, and after adding 63.0 g of aqueous 50% by weight solution of dimethylamine (corresponding to 0.7 moles) and 56.8 g of aqueous 37% by weight solution of formaldehyde (corresponding to 0.7 moles) into phenol within the flask, the mixture was kept at 55° C. for 4 hours while stirring the mixture to carry out Mannich reaction. Into another flask, 34.2 g (0.15 moles) of bisphenol A was introduced, and after adding 40.5 g of aqueous 50% by weight solution of dimethylamine (corresponding to 0.45 moles) and 36.5 g of aqueous 37% by weight solution of formaldehyde (corresponding to 0.45 moles) into bisphenol A within the flask, the mixture was kept at 55° C. for 4 hours while stirring the mixture to carry out Mannich reaction. Then both the products of Mannich reaction were mixed together, and 46.3 g (0.5 moles) of epichlorohydrin was added dropwise to the mixture while keeping the mixture at 45° C. under stirring during 40 mins. After 4 hours of the ending of addition of epichlorohydrin, when the gradually raising viscosity of the reaction mixture showed 9000 cp in Brookfield viscometer, 67.8 g of aqueous 35% by weight solution of hydrochloric acid (corresponding to 0.65 mole) was added to the reaction mixture to stop polycondensation.

The viscosity of solution of the reaction product was 6500 cp at 25° C. in Brookfield viscometer, corresponding to the intrinsic viscosity, [$\eta$], of 0.99 dl/g.

EXAMPLE 4

Into a flask, 42.3 g (0.45 moles) of phenol and 11.4 g (0.05 moles) of bisphenol A were introduced, and after adding 99 g of aqueous 50% by weight solution of dimethylamine (corresponding to 1.1 moles) and 89.2 g of aqueous 37% by weight solution of formaldehyde (corresponding to 1.1 moles) to the system of phenol and bisphenol A, the mixture was kept at 55° C. for 4 hours while stirring the mixture to carry out Mannich reaction. To the solution of Mannich reaction products, 46.3 g (0.5 moles) of epichlorohydrin was added dropwise while keeping the reaction mixture at 40° C. under stirring during 40 mins. After 2 hours of the ending of addition of epichlorohydrin, when the gradually raising viscosity of the reaction mixture showed 8000 cp in Brookfield viscometer, 62.6 g (0.6 mole) of aqueous 35% by weight solution of hydrochloric acid (corresponding to 0.6 mole) was added to the reaction mixture to stop polycondensation.

The viscosity of solution of the reaction product was 3900 cp at 25° C. in Brookfield viscometer, corresponding to the intrinsic viscosity, [$\eta$], of 0.82 dl/g.

COMPARATIVE EXAMPLE

Into a flask, 28.2 g (0.3 moles) of phenol was introduced, and after adding 81.0 g (0.9 moles) of aqueous 50% by weight solution of dimethylamine and 73.0 g (0.9 moles) of aqueous 37% by weight solution of formaldehyde (0.9 moles) into phenol with the flask, the mixture was kept at 55° C. for 4 hours while stirring to carry out Mannich reaction. Into the thus obtained Mannich reaction product, 27.8 g (0.3 moles) of epichlorohydrin was added dropwise during 30 min while keeping the mixture at 40° C. under stirring. After one hour of the end of addition of epichlorohydrin when the viscosity of the mixture showed gradual increase to 8000 cp by Brookfield viscometer, 62.6 g (0.6 moles) of aqueous 35% by weight solution of hydrochloric acid was added to the reaction mixture to stop polycondensation. The viscosity of the thus prepared reaction product was 2800 cp in Brookfield viscometer at 25° C., corresponding to intrinsic viscosity, [$\eta$], of 0.80.

EXAMPLE 5

Each one of the polycondensate prepared in Examples 1 to 4 and Comparative Example was diluted with water to be an aqueous solution with a concentration of polymer of 0.5% by weight, and after warming to 50° C. for a predetermined time period, the amount of polymeric cation in the solution was determined by colloid-titration at pH of 4 by using 1/400 N potassium polyvinylsulfate.

The results of determination are shown in Table 1 in the case where the amount of polymeric cation before heating is set at 100.

TABLE 1

Reduction of Amount of Polymeric Cations with Time

| Specimen | After one day | After two days |
|---|---|---|
| Example 1 | 80.7 | 71.8 |
| Example 2 | 75.1 | 67.6 |
| Example 3 | 86.3 | 80.5 |
| Example 4 | 64.3 | 56.2 |
| Comparative Example | 37.5 | 31.9 |

As is seen in Table 1, as a result of addition of the Mannich reaction products of bisphenol A into the component of polycondensate, the reduction of the amount of polymeric cations is clearly suppressed.

EXAMPLE 6

Two hundred ml of an aqueous 0.5% by weight suspension of bentonite was prepared in a 200 ml volumetric cylinder and adding each specimen shown in Table 2 to the suspension in the cylinder, the cylinder was turned upside down about ten times to stir the content, then the cylinder was stood for 5 minutes. The tests were repeated with varied amount of each specimen and the amount of each specimen was investigated to make the liquid in the cylinder clear and transparent. The added amount of the specimen is shown in Table 2 as the amount of active ingredient in the specimen, namely, the polycondensate.

TABLE 2

| Specimen | Amount of addition (mg) |
|---|---|
| Example 1 | 8.0 |
| Example 2 | 8.0 |
| Example 3 | 8.2 |
| Example 4 | 8.4 |
| Comparative Example | 8.3 |
| A commercial product[1] | 14.6 |

Note:
[1] polycondensate of dimethylamine and epichlorohydrin

As are seen in Table 2, the product according to the present invention has a flocculating performance nearly equal to that of the product in Comparative Example.

EXAMPLE 7

An aqueous solution of 0.5% by weight of each polycondensate obtained by Examples 1 to 4 and Comparative Example was prepared and the solution was kept at 50° C. for one day. Each polycondensate was deteriorated and reduced its amount of polymeric cation as Example 5.

Test of Example 6 was repeated by using thus deteriorated polycondensate, and an amount of polycondensate added to clarify the suspension was determined. The result was shown in Table 3.

TABLE 3

| Specimen | Amount of addition (mg) |
|---|---|
| Example 1 | 11.0 |
| Example 2 | 12.3 |
| Example 3 | 10.2 |
| Example 4 | 16.4 |
| Comparative Example | 35.8 |

The result of Table 3 showed that polycondensates of the present invention in an aqueous solution were more stable than that of Comparative Example.

What is claimed is:

1. A cationic polymer flocculant comprising a polycondensate of (i) epihalohydrine and (ii) a mixture of component (a) and component (b) at a molar ratio of (a)/(b) in the range of 90/10 to 50/50 wherein said component (a) is a reaction product of monohydric phenol with formaldehyde and dialkylamine of two to six carbon atoms, and said component (b) is a reaction product of bisphenol with formaldehyde and dialkylamine of two to six carbon atoms.

2. The polymer flocculant according to claim 1, wherein the component (a) is a reaction product of one part by mole of monohydric phenol with one to three parts by mole of formaldehyde and substantially equimolar amount to said formaldehyde of dialkylamine.

3. The polymer flocculant according to claim 1, wherein the component (b) is a reaction product of one part by mole of bisphenol with one to four parts by mole of formaldehyde and substantially equimolar amount to said formaldehyde of dialkylamine.

4. The polymer flocculant according to claim 1, wherein the mixture of component (a) and component (b) is prepared by reacting monohydric phenol, bisphenol, formaldehyde and dialkylamine in the ratio represented by the following formulae $$2X+2Y \leq M^1 \leq 3X+4Y, \text{ and}$$

$$2X+2Y \leq M^2 \leq 3X+4Y$$

wherein $X$, $Y$, $M^1$ and $M^2$ respectively represent the molar amount of said monohydric phenol, said bisphenol, said formaldehyde and said dialkylamine.

5. The polymer flocculant according to claim 1, wherein the molar amount of epihalohydrin to be reacted is 0.7 to 2.0 times of the sum of the molar amount of monohydric phenol and that of bisphenol.

6. The polymer flocculant according to claim 1, wherein epihalohydrin is epichlorohydrin.

7. The polymer flocculant according to claim 1, wherein monohydric phenol is phenol.

8. The polymer flocculant according to claim 1, wherein bisphenol is 2,2-bis(4-hydroxyphenol)propane.

9. The polymer flocculant according to claim 1, wherein dialkylamine is dimethylamine.

10. The polymer flocculant according to claim 1, wherein the molar ratio of (a)/(b) is from 85/15 to 50/50.

11. A cationic polymer flocculant comprising a polycondensate of (i) epichlorohydrin and (ii) a mixture of component (a) and component (b) at a molar ratio of (a)/(b) in the range of 90/10 to 50/50 wherein said component (a) is a reaction product of phenol with formaldehyde and dimethylamine, and said component (b) is a reaction product of 2,2-bis(4-hydroxyphenyl)propane with formaldehyde and dimethylamine.

* * * * *